United States Patent [19]
Hobbensiefken

[11] 3,910,626
[45] Oct. 7, 1975

[54] CONVERTIBLE SEAT FOR SLEEPER CAB
[75] Inventor: Dean Hobbensiefken, Lyons, Oreg.
[73] Assignee: Ryder Truck Rental, Inc., Miami, Fla.
[22] Filed: Aug. 14, 1974
[21] Appl. No.: 497,395

[52] U.S. Cl.................................. 296/69; 297/118
[51] Int. Cl.²........................................... B60N 1/10
[58] Field of Search ................ 297/15, 47, 51, 118; 296/69

[56] References Cited
UNITED STATES PATENTS
3,140,114   7/1964   Stephenson et al................... 296/69
3,473,840  10/1969   Miles ............................. 297/118 X Primary Examiner—James C. Mitchell
Attorney, Agent, or Firm—Watson, Cole, Grindle & Watson

[57] ABSTRACT

A convertible seat construction is hingedly mounted at its legs within a sleeper cab for movement between a fully upright seated position and a collapsed horizontal position for sleeping. The seat may be locked into its upright position as well as into a reclining position, and the seat back is guided along vertical guide members during seat movement.

9 Claims, 7 Drawing Figures

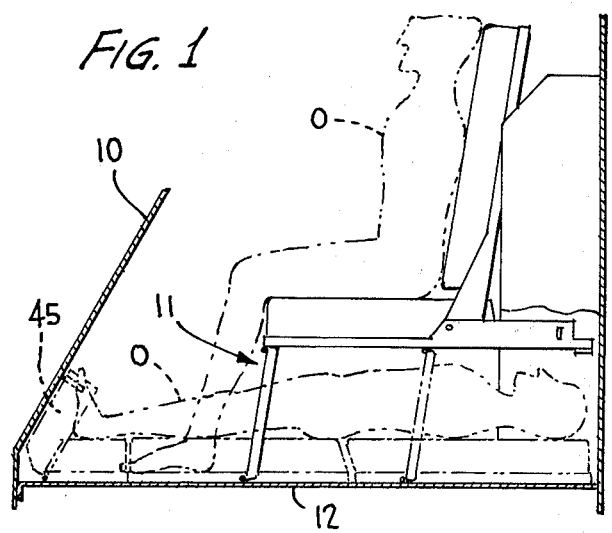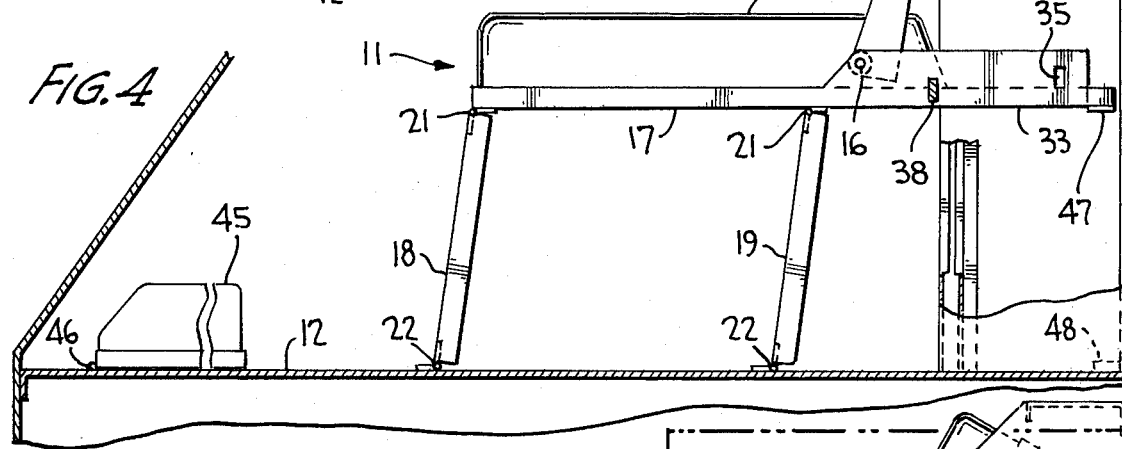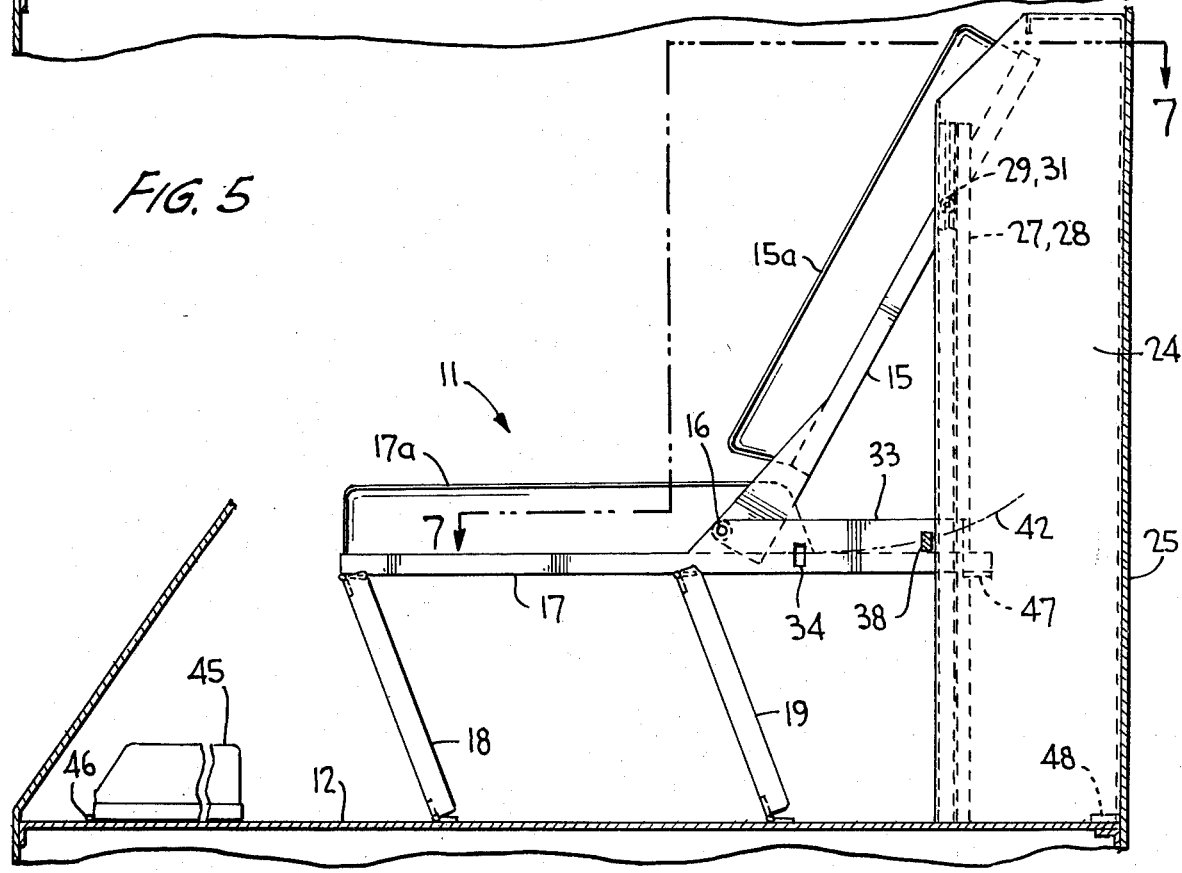

CONVERTIBLE SEAT FOR SLEEPER CAB

This invention relates generally to a seat construction, and more particularly to such a seat which is convertible from its erect seated position to a collapsed sleeping position for a truck sleeper cab.

The cabs of tractor-trailer vehicles having sleeping facilities are customarily in the nature of a flat bed or elongated pad extending transversely across the cab behind the driver's back. With such a sleeper cab arrangement the driver's safety may be compromised, especially during abrupt truck movements by reason of the close proximity of the sleeper to the back of the driver. Moreover, the sleeper occupant is exposed to the danger of being thrown forward during abrupt vehicle stopping situations.

A sleeper construction disposed parallel to the axis of the vehicle's direction of travel adjacent the driver would therefore not only avoid the possibility of the sleeper occupant rolling forwardly during abrupt vehicle motions, but it would also avoid the hazard of creating any possible interference with the driver. It is therefore an object of this invention to provide a seat construction for a sleeper cab which is located adjacent the driver's seat and faces toward a forward direction of vehicle movement, such a seat being convertible into a sleeper lying parallel to the moving axis of the vehicle.

Another object is to provide such a seat construction which includes a seat back pivotally interconnected with a seat bottom which is hingedly connected to the floor wall of the cab by means of its leg members, the seat back being guided vertically so that the seat construction is capable of movement between an erect seating position and a collapsed position for sleeping.

A further object is to provide such a seat construction wherein lock means are provided for locking the seat construction to the vertical quides in a position other than the collapsed position thereof.

Other objects, advantages and novel features of the invention will become more apparent from the following detailed description of the invention when considered in conjunction with the accompanying drawings wherein:

FIG. 1 is a view schematically showing the seat construction of the invention in relation to the truck cab, the seat being shown in solid outline in its erect position for seating and in its collapsed position for sleeping shown in phantom outline;

FIGS. 4 and 5 are views similar to FIG. 3 except that the seat construction is shown in its fully erect position and in a reclining position, respectively;

Figure 2:
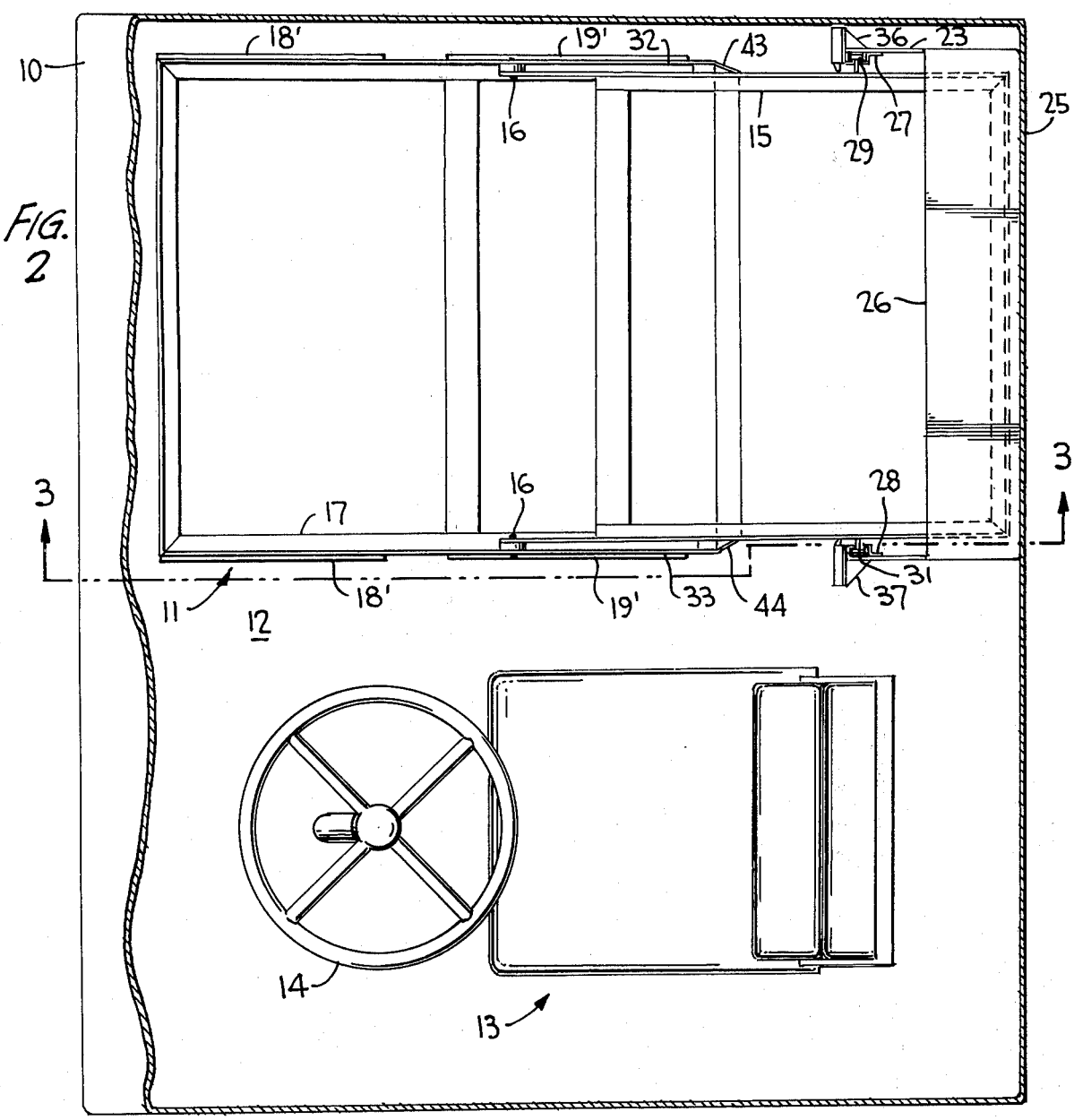
FIG. 2 is a top view at an enlarged scale of the truck cab showing both the driver's seat and the seat construction of the invention in relation thereto, the seat being shown in its collapsed position for sleeping.

Turning now to the drawings wherein like reference numerals refer to like and corresponding parts throughout the several views, a truck cab 10 is shown in general outline in FIG. 1 with the seat construction generally designated 11 shown mounted in place on the floor wall 12 of the cab. The seat construction is shown in its erect seating position in solid outline and in its collapsed position for sleeping in phantom outline in FIG. 1. In FIG. 2, a conventional driver's seat 13 behind steering wheel 14 is shown in its normal manner facing the forward direction of travel of the truck indicated by the arrow. Seat construction 11 is shown mounted in place in its relation to the driver's seat parallel to the direction of movement of the vehicle in its collapsed position of FIGS. 2 and 3, and facing in such forward direction in its seating position as clearly seen in FIG. 4. The presently devised convertible seat includes a seat back 15 pivotally connected as at 16 to a seat bottom 17. The seat cushions 15a and 17a are mounted in place in any conventional manner to their respective seat back and seat bottom. A showing of these cushions is omitted from FIGS. 2, 6 and 7 for the purpose of clarity.

Figure 3:
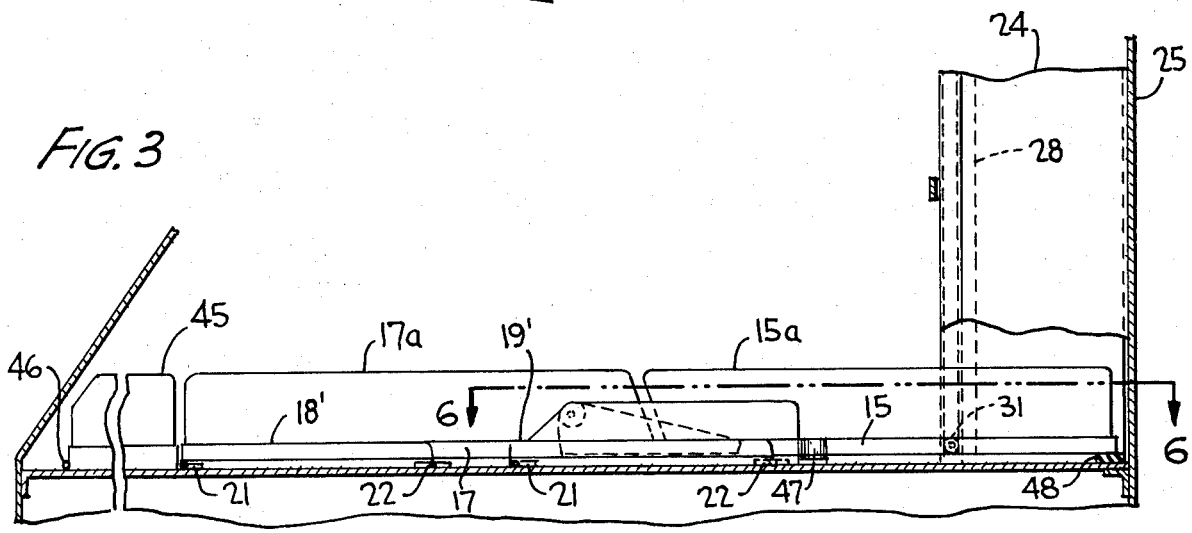
FIG. 3 is a side elevational view of the seat construction partly in section taken along line 3—3 of FIG. 2.

The seat construction further comprises a pair of forward leg members 18 near the forward corners of seat bottom 17, and a pair of rearward leg members 19 spaced from the forward ones. Each of the leg members may be in the form of an angle plate hingedly connected as at 21 to the underside of seat bottom 17 and likewise hingedly connected to floor wall 12 of the cab as at 22. The leg members are so disposed that their outer flanges 18' and 19' lie outwardly of the collapsed seat back and bottom as shown in FIGS. 2 and 3.

Side plates 23 and 24 are mounted to back wall 25 of the cab as well as to floor wall 12 and are disposed slightly outwardly of the seat construction as in the manner shown in FIG. 2. A top cover plate 26 interconnects the side plates for stability. Inwardly open channel members 27 and 28 are secured along the inner surfaces of respective side plates 23 and 24 and serve as vertical guides for the seat back. Rollers 29 and 31 are mounted at opposite sides of the seat back for respectively rolling within channels 27 and 28 which channels serve as vertical guides for the seat back when the seat is moved between its positions of FIGS. 4 and 3. As can be seen, the rollers are so disposed as to lie near the top ends of the channel members in the erect position of the seat shown in FIG. 4, and to lie near the lower end of the channels in the collapsed position of the seat of FIG. 3.

The seat bottom is constructed in any normal manner and has rearward extensions 32, 33 each with a pair of spaced openings 34, 35 therein.

Figure 6:
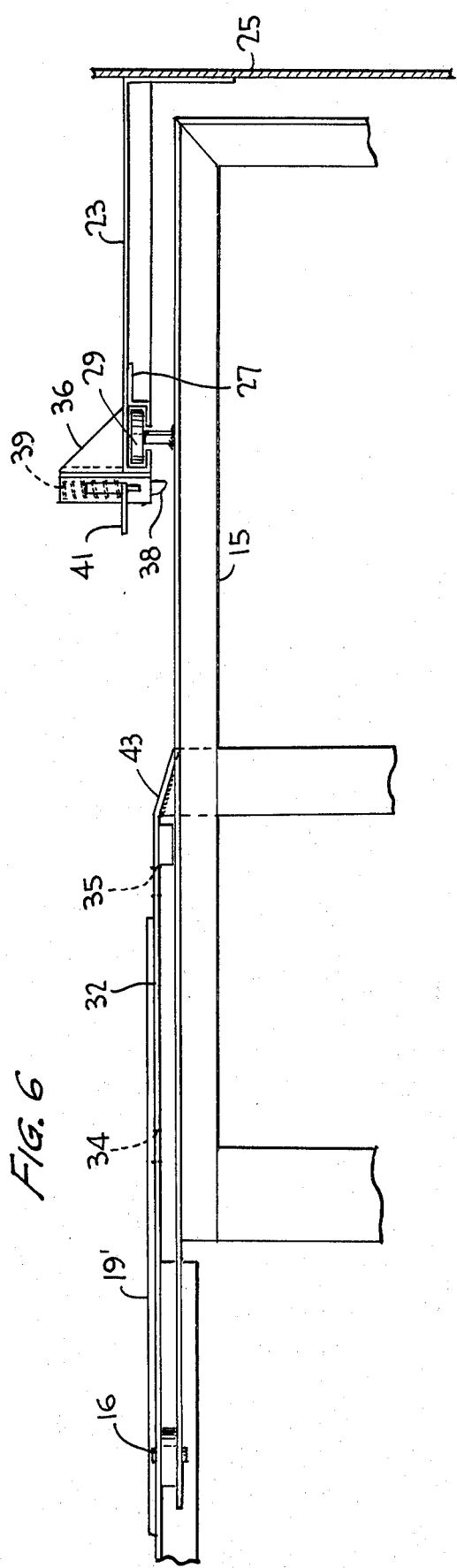
FIG. 6 is a top plan view with the cushions omitted showing a portion of the seat construction in its collapsed position taken along line 6—6 of FIG. 3.
Figure 7:
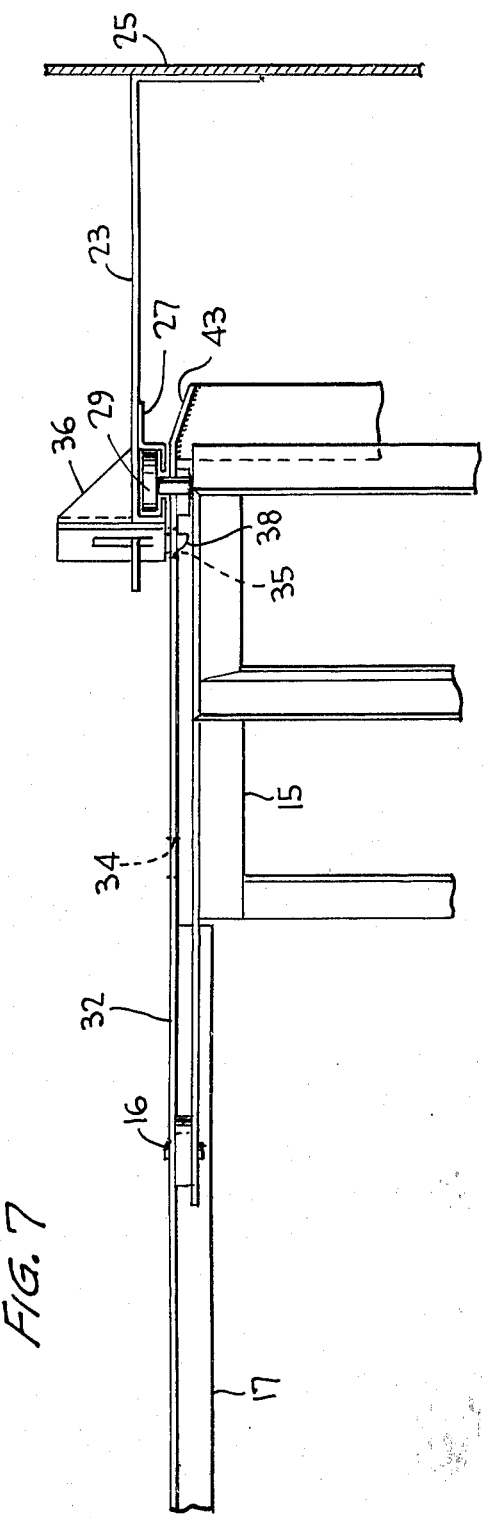
FIG. 7 is a top plan view of the seat construction with the cushions omitted showing a portion of the seat in its reclining position taken along line 7—7 of FIG. 5.

Lock means 36 and 37 are respectively mounted to plates 23 and 24, each such means including a lock pin 38 urged inwardly by means of a coil spring 39 and being manually operable by means of a lever 41 (see FIG. 6).

Openings 34 and 35 are so disposed on extensions 32 and 33 that lock pins 38 extend into openings 34 for locking the seat bottom to the vertical guides in the erect seating position of FIG. 4. This is the position in which the occupant O is seated as in the customary manner facing forwardly during vehicle travel as when both drivers are awake. The seat construction is, however, capable of being partially collapsed into a reclining position of FIG. 5. Openings 35 are so disposed in extensions 32 and 33 that they will be placed in axial alignment with lock pins 38 which extend therethrough for locking the seat in place in its reclining position. For movement into such position, the operator merely depresses levers 41 outwardly and allows the seat bottom to be moved slightly forwardly until openings 35 are in alignment with the lock pins. Release of each lever then obviously permits the lock pins to extend through openings 35 for locking the seat in its FIG. 5 position. During such forward movement of the seat bottom, it can be seen that the seat back pivots slightly rearwardly into a reclining position about its pivotal connections 16 as well as about its rollers 29, 31 which will have moved slightly downwardly along their respective channel members. It should be noted that, although only two openings such as 34, 35 have been shown, additional openings could be provided along each arcuate path 42 which is the path assumed by the seat bottom during its forward movement between its positions of FIGS. 4 and 5. The seat construction could therefore be reclined to a greater or lesser extent than that shown in FIG. 5, without departing from the spirit of the invention, if additional openings were provided.

In order to convert the present seat construction into a sleeper, levers 41 are depressed outwardly when the seat is in either its FIG. 4 or FIG. 5 position and allowed to drop onto floor 12 so that both seat bottom 17 and seat back 15 lie flat along the floor wall of the cab as in the manner shown in FIG. 3. Leg members 18 and 19 merely pivot at their hinged connections so as to partially underlie the seat back and bottom with their flanges 18' and 19' located just outwardly of opposite sides of the seat. During this movement into its collapsed position, the seat bottom is moved downwardly and forwardly and the seat back is moved from its erect position of FIG. 4 into a continuous reclining position until it reaches the floor wall of the cab shown in FIG. 3 during which time its rollers 29 and 31 move between the top and the bottom ends of their respective channel members thereby guiding the seat back therealong. When the operator desires to return the seat to its reclining position of FIG. 5, the seat bottom is merely lifted upwardly and moved rearwardly until openings 35 are placed in alignment with lock pins 38. To facilitate a locking of the seat in this position without manipulating levers 41, extensions 32 and 33 are provided with cam surfaces 43, 44 which serve to depress the lock pins outwardly from their position of FIG. 6 to that of FIG. 7 so as to permit them to be automatically extended into openings 35. Obviously, if the seat is to be placed into a fully erect position of FIG. 4, levers 41 are both manually moved outwardly until their lock pins are aligned with openings 34, and then released in the manner described earlier.

In order to provide an additional longitudinal extension for cushions 15a and 17a while in the collapsed sleeping position of FIG. 3, a cushion or pad 45 is disposed forwardly of cushion 17a and adjacent thereto, and is mounted on floor wall 12 for pivotal movement about a hinge 46. Pad 45 may be placed in its lowered position of FIG. 3 when the seat construction is used as a sleeper, and may be pivoted upwardly and latched in place in any normal manner as in FIG. 1, so as to provide more foot room for the seat occupant while in the FIG. 4 position of the seat. Also, a resilient pad 47 of elastomeric material, for example, is provided at the underside of extensions 32 and 33 at the rearward ends thereof (see FIG. 4). A similar type pad 48 is provided at each rearward corner of the cab on floor wall 12 so that, when the seat is in its collapsed position of FIG. 3, the seat back and seat bottom are in substantially the same horizontal plane when resting on pads 47 and 48. The thickness of these pads should be of about the same gauge thickness as the flanges of leg members 18 and 19 so as to assure a substantially level and stable sleeper when in its collapsed position on the floor wall.

To summarize, it can be seen that a seat construction which is convertible into a sleeper has been devised for truck cabs in a manner which is easy to operate, durable, easy to manufacture and highly economical. The seat construction faces forwardly in the direction of travel of the vehicle and takes the place of the seat normally located in the same position. Moreover, the seat is easily and effectively converted into a sleeper disposed parallel to the direction of travel of the vehicle thereby avoiding any danger of interference with the driver or the sleeper occupant's own safety during vehicle movement.

Obviously, many modifications and variations of the present invention are possible in the light of the above teachings. For example, it may be desirable to lock the seat back or some other portion of the seat to the guide channel members in some manner as an alternative to locking the seat bottom thereto. And, standard structural materials other than those shown can be used when desired. It is therefore to be understood that within the scope of the appended claims the invention may be practiced otherwise than as specifically described.

What is claimed is:

1. A convertible seat construction for a sleeper cab having a floor wall, comprising:
    a seat bottom;
    a seat back pivotally interconnected with said seat bottom;
    leg members hingedly connected at one end thereof to said seat bottom and hingedly connected at the other end thereof to said floor wall for supporting said seat bottom;
    vertical guide means for said seat back; and
    roller means interconnecting said seat back with said guide means;
    said seat back being thereby guided along said vertical guide means between an erect position and a lowered position lying against said floor wall, and said seat bottom being pivoted about said other ends of said leg members between an upward position spaced from said floor wall and a lowered position lying against said floor wall, whereby said seat back and said seat bottom together form both an upright seat as well as a collapsed horizontal sleeper.

2. The seat construction according to claim 1, wherein lock means are provided for locking said seat bottom into its position spaced from said floor wall.

3. The seat construction according to claim 1, wherein a lock pin spaced from said floor wall is provided on said guide means and at least one opening is located in said seat bottom, said pin extending into said opening for locking said seat bottom into its position spaced from said floor wall.

4. The seat construction according to claim 1, wherein lock means spaced from said floor wall are provided on said guide means and cooperate with said seat bottom for locking said seat back and seat bottom into their upright position as well as into a reclined position intermediate said upright seat and said lowered positions.

5. The seat construction according to claim 1, wherein a pad is provided on said floor wall adjacent to and in alignment with said seat bottom to thereby form an extension of the collapsed horizontal sleeper.

6. In a wheeled truck cab having a floor wall and a driver's seat facing in a forward direction of movement of the cab, a seat construction convertible into a sleeper mounted on said floor wall adjacent said driver's seat and likewise facing in the forward direction of movement of the cab, said convertible seat comprising:

a seat back and a seat bottom pivotally interconnected together;

leg members hingedly connecting said seat bottom to said floor wall; and vertical guides to which said seat back is movably connected for guiding same for movement between an erect position at an angle to said floor wall and a collapsed position lying parallel against said floor wall;

said seat bottom being movable along with said seat back between an erect position spaced from said floor wall and a collapsed position lying parallel against said floor wall, whereby said seat construction is capable of use both as a seat in said erect positions of said seat back and said seat bottom, and as a sleeper in said collapsed positions of said seat back and said seat bottom.

7. In the wheeled truck cab according to claim 6, wherein lock means are provided for locking said seat construction to said vertical guides in a position other than in the collapsed position.

8. In the wheeled truck cab according to claim 7, wherein said lock means comprises a lock pin mounted on said guides for movement into and out of engagement with spaced openings located in a portion of said seat bottom extending toward said guides, whereby said seat construction may be locked in its erect position as well as in a reclining position between the erect position and the collapsed position.

9. In the wheeled truck cab according to claim 7, wherein a pad is provided on said floor wall adjacent said seat bottom and forwardly thereof forming an extension of the sleeper.

* * * * *